US008952093B2

(12) United States Patent
Mannari

(10) Patent No.: US 8,952,093 B2
(45) Date of Patent: Feb. 10, 2015

(54) BIO-BASED POLYURETHANE DISPERSION COMPOSITIONS AND METHODS

(75) Inventor: Vijaykumar M. Mannari, Saline, MI (US)

(73) Assignee: Eastern Michigan University, Ypsilanti, MI (US)

( * ) Notice: Subject to any disclaimer, the term of this patent is extended or adjusted under 35 U.S.C. 154(b) by 345 days.

(21) Appl. No.: 13/396,988

(22) Filed: Feb. 15, 2012

(65) Prior Publication Data

US 2012/0214938 A1 Aug. 23, 2012

Related U.S. Application Data

(60) Provisional application No. 61/444,621, filed on Feb. 18, 2011.

(51) Int. Cl.

| | |
|---|---|
| B05D 3/02 | (2006.01) |
| B32B 27/00 | (2006.01) |
| B32B 27/40 | (2006.01) |
| C08G 18/00 | (2006.01) |
| C08G 18/08 | (2006.01) |
| C08G 18/28 | (2006.01) |
| C08L 75/00 | (2006.01) |
| C08G 18/36 | (2006.01) |
| C08G 18/66 | (2006.01) |
| C08G 18/75 | (2006.01) |
| C08G 18/12 | (2006.01) |
| C09D 175/04 | (2006.01) |
| C08G 18/34 | (2006.01) |

(52) U.S. Cl.
CPC ............ *C08G 18/36* (2013.01); *C08G 18/6662* (2013.01); *C08G 18/755* (2013.01); *C08G 18/0823* (2013.01); *C08G 18/12* (2013.01); *C09D 175/04* (2013.01); *C08G 18/348* (2013.01)
USPC ..................... 524/591; 427/372.2; 427/385.5; 428/423.1; 524/589; 524/590; 524/839; 524/840; 528/44; 528/66; 528/76; 528/77; 528/85

(58) Field of Classification Search
CPC ............ C08J 3/05; C08J 3/07; C08J 2375/02; C08J 2375/04; C08J 2375/08; C08K 3/20; C08L 75/00; C08L 75/02; C08L 75/04; C08L 75/08; C08G 18/0823; C08G 18/12; C08G 18/348; C08G 18/36; C08G 18/4825; C08G 18/4858; C08G 18/4891; C08G 18/6212; C08G 18/627; C08G 18/65; C08G 18/6505; C08G 18/6511; C08G 18/6529; C08G 18/6541; C08G 18/6547; C08G 18/6603; C08G 18/6607; C08G 18/6618; C08G 18/6625; C08G 18/6629; C08G 18/6674; C08G 18/6685; C08G 18/6692; C08G 18/6696; C08G 18/6795; C09D 5/02; C09D 175/02; C09D 175/08; B05D 3/007; B05D 3/0406; B32B 27/40; B32B 2375/00
USPC .......... 524/589, 590, 591, 839, 840; 427/372.2, 385.5; 428/423.1; 528/44, 528/66, 76, 77, 85
See application file for complete search history.

(56) References Cited

U.S. PATENT DOCUMENTS

| | | | |
|---|---|---|---|
| 4,147,679 A | * | 4/1979 | Scriven et al. ................. 523/404 |
| 5,608,000 A | | 3/1997 | Duan et al. |
| 6,287,698 B1 | | 9/2001 | Zhu et al. |
| 7,045,573 B2 | | 5/2006 | Mayer et al. |
| 2005/0288431 A1 | | 12/2005 | Gindin et al. |
| 2010/0330375 A1 | | 12/2010 | Pajerski et al. |

OTHER PUBLICATIONS

Zhang et al., Substituting Soybean Oil-Based Polyol Into Polyurethane Flexible Foams, Polymer 2007, 48, 6656-6667.
Liaw et al., Synthesis and Properties of Polyurethanes Based on Bisphenol-S Derivatives, Polymer 1998, 39, 3529-3535.
Lee et al., Preparation and Properties of Water-Borne Polyurethanes, Polym. Int. 1997, 42, 67-76.
Meier et al., Plant Oil Renewable Resources as Green Alternatives in Polymer Science, Chem. Soc. Rev. 2007, 36, 1788-1802.
Williams et al., Polymers From Renewable Resources: A Perspective for a Special Issue of Polymer Reviews, Polym. Rev. 2008, 48, 1-10.
Biermann et al., New Syntheses With Oils and Fats as Renewable Raw Materials for the Chemical Industry, Angew. Chem. Int. Ed., 39, 2206-2224 (2000).
Guo et al., Structure and Properties of Halogenated and Nonhalogenated Soy-Based Polyols, J. Polym. Sci., Part A: Polym. Chem. 2000, 38, 3900-3910.
Petrović et al., Structure and Properties of Polyurethanes Based on Halogenated and Nonhalogenated Soy-Polyols, J. Polym. Sci., Part A: Polym.Chem. 2000, 38, 4062-4069.
Lligadas et al., Poly(Ether Urethane) Networks From Renewable Resources as Candidate Biomaterials: Synthesis and Characterization, Biomacromolecules 2007, 8, 686-692.
Kong et al., Physical Properties of Polyurethane Plastic Sheets Produced from Polyols from Canola Oil, Biomacromolecules 2007, 8, 2203-2209.

(Continued)

*Primary Examiner* — Patrick Niland
(74) *Attorney, Agent, or Firm* — Marshall, Gerstein & Borun LLP

(57) ABSTRACT

The disclosure relates to water-dispersible polyurethane polymers as well as related polyurethane dispersion (PUD) compositions including the same, methods of making the same, methods of using the same, and articles coated with the same. The water-dispersible polyurethane polymer includes hydrophobic oligomeric polyether soft segments that include 1,2-di-substituted oxyethylene repeating units. The 1,2-di-substituted oxyethylene repeating units are derived from unsaturated fatty acid esters, such as from a distribution of epoxidized vegetable oil fatty acid esters subjected to a ring-opening polymerization process for oligomeric polyether polyol formation. The water-dispersible polyurethane polymer further includes hard segments common to other PUD compositions.

22 Claims, 5 Drawing Sheets

(56) References Cited

OTHER PUBLICATIONS

Erdem et al., High Performance Water Borne Polyurethane Dispersions Based on Natural Oil Polyols for Wood Coating Applications, Third International Coating wood AC Series Conference, Sep. 2009.

Petrović et al., Polyurethane Networks from Polyols Obtained by Hydroformylation of Soybean Oil, P. Polym. Int. 2008, 57, 275-281.

Petrović et al., Structure and Properties of Polyurethanes Prepared from Triglyceride Polyols by Ozonolysis, Biomacromolecules 2005, 6, 713-719.

Petrović, Z. S., Polyurethanes from Vegetable Oils, Polymer Reviews (2007), 48(1), 109-155.

Lu et al., Soybean-Oil-Based Waterborne Polyurethane Dispersions: Effects of Polyol Functionality and Hard Segment Content on Properties, Biomacromolecules 2008, 9, 3332-3340.

Lligadas et al., Synthesis and Characterization of Polyurethanes from Epoxidized Methyl Oleate Based Polyether Polyols as Renewable Resources, Journal of Polymer Science: Part A: Polymer Chemistry, vol. 44, 634-645 (2006).

Nanda et al., Nanostructured Polyurethane/POSS Hybrid Aqueous Dispersions Prepared by Homogeneous Solution Polymerization, Macromolecules 2006; 39:7037-7043.

Nanda et al., The Influence of the Ionic Concentration, Concentration of the Polymer, Degree of Neutralization and Chain Extension on Aqueous Polyurethane Dispersions Prepared by the Acetone Process, Polymer 2006; 47, 1805-1811.

Subramani et al., Synthesis and Characterization of Water-Borne Crosslinked Silylated Polyurethane Dispersions, Journal of Applied Polymer Science, 98, 620-631 (2005).

Mannari et al., Novel Polyurethane Dispersions with High Biobased Content, presented at American Coatings Conference 2010, Charlotte, NC, Apr. 12-14, 2010.

* cited by examiner

BIO-BASED POLYURETHANE DISPERSION COMPOSITIONS AND METHODS

CROSS-REFERENCE TO RELATED APPLICATION

This application claims the benefit of U.S. Provisional Patent Application No. 61/444,621, filed Feb. 18, 2011, the disclosure of which is incorporated herein by reference in its entirety.

STATEMENT OF GOVERNMENT INTEREST

This invention was made with government support from the USDA Cooperative State Research, Education, and Extension Services (CSREES) through grant award no. 2009-38202-05085. The government has certain rights in the invention.

BACKGROUND OF THE DISCLOSURE

1. Field of the Disclosure

The disclosure relates to water-dispersible polyurethane polymers as well as related methods and articles. The water-dispersible polyurethane polymer includes hydrophobic oligomeric polyether soft segments that include 1,2-di-substituted oxyethylene repeating units. The 1,2-di-substituted oxyethylene repeating units are derived from unsaturated fatty acid esters, such as from a distribution of vegetable oil fatty acid esters. The water-dispersible polyurethane polymer further includes hard segments common to other polyurethane dispersions compositions.

2. Brief Description of Related Technology

Polyurethane dispersions (PUDs) have emerged as very important class of binders for coatings due to their versatility, performance, and low volatile organic carbon (VOC) content. The conventional commercial PUDs are almost exclusively derived from petrochemical resources accounting for their high carbon foot-print, as well as their increasingly high cost.

Examples of PUD compositions may be found in U.S. Pat. Nos. 5,608,000, 6,287,698, 7,045,573, U.S. Publication Nos. 2005/0288431, and 2010/033075.

SUMMARY

The disclosure generally relates to water-dispersible polyurethane polymers (e.g., for use in polyurethane dispersion (PUD) compositions) as well as related methods of making the same, methods of using the same, and articles coated with the same. The water-dispersible polyurethane polymer includes hydrophobic oligomeric polyether soft segments that include 1,2-di-substituted oxyethylene repeating units. The 1,2-di-substituted oxyethylene repeating units are derived from unsaturated fatty acid esters, such as from a distribution of epoxidized vegetable oil fatty acid esters subjected to a ring-opening polymerization process for oligomeric polyether polyol formation. The water-dispersible polyurethane polymer further includes hard segments common to other PUD compositions.

The disclosed water-dispersible polyurethane polymer provides bio-based alternative to conventional PUD polymers, thus promoting the sustainable development of such coatings. Using the oligomeric polyether polyol derived from renewable, bio-based resources such as any of a variety of vegetable oils (e.g., from epoxidized fatty acid esters derived from vegetable oil triglycerides), the disclosed polyurethane dispersions can be forming with a bio-based (carbon) content of up to about 60% or about 70% using an otherwise conventional prepolymer process. Films formed from the polyurethane dispersions have favorable for physical properties (e.g., water and acid resistance) and mechanical properties (e.g., hardness and impact resistance). The high bio-based content, ease of processing, versatility, and excellent performance properties of disclosed polyurethane polymers and dispersions provide environmentally-friendly and sustainable binders for coatings.

In the recent years, aqueous polyurethane dispersions (PUDs) have established themselves as one of the most important binder systems for such applications as coatings, adhesives, sealants and elastomers (CASE). Their increasing acceptance, both in architectural and industrial coatings, is mainly driven by their low volatile organic content (VOC) that allows formulations of environmentally compliant coatings combined with excellent performance properties of polyurethane for myriads of applications. Polyurethanes are segmented polymers comprising of alternating sequences of soft segments and hard segments, which constitute a microphase separation structure. Coatings with tailor-made properties can be attained by manipulation of type and relative proportion of soft and hard segments. PUDs present many advantages over conventional solvent borne polyurethanes, including low viscosity at low molecular weight, absence of hazardous free-isocyanate compounds, faster drying time, beside others. The typical thermoplastic PUDs are dispersions of high molecular weight segmented polyurethanes that essentially form films by physical drying. Such systems have become very popular in architectural coating field due to their ability to form coatings with desirable properties under ambient conditions. Despite being thermoplastic in nature, the segmented polyurethane structure provides excellent mechanical and chemical resistance properties due to strong hydrogen bonding through urethane groups and their high molecular weight, making them preferred candidates for a number of high performance industrial applications.

PUDs, like most other contemporary coating binders, are generally based on fast depleting petrochemical feedstock. For sustainable development of such advanced technologies, it is increasingly important to develop alternative renewable material platform. Vegetable oils are agro-based renewable materials available at relatively low cost. The unique combination of their chemical structure, functionality and reactivity combined with low toxicity and inherent biodegradability makes them excellent resource for deriving sustainable polymers. There have been many studies that demonstrate use of vegetable oils in modifying polyurethanes. One of the most attractive performance benefits of using vegetable oil-based polyols in water-borne system is excellent water resistance of their films and enhanced hydrolytic stability—an important property of resins for waterborne applications.

Typical PUD chains are comprised of alternating sequence of soft segments (polymeric polyol) and hard segments (urethane group, isocyanate moiety, ionic center, chain extenders), shown as a schematic representation in FIG. 1. Polymeric/oligomeric polyols can constitute about 50 wt. % of the PUD polymer and hence are important contributors to both cost and mechanical and chemical performance of their coatings. Polymeric/oligomeric polyols with such variety of backbone chemistry as polyester, polyether, polycarbonate, etc. can be used to confer wide range of performance and cost, for various end-use applications.

Vegetable oil-based polyols have been explored as components of polyurethane (e.g., vegetable oil-derived polyols as PUD soft segments) by using a variety of chemistries. With a few exceptions, common vegetable oils do not have hydroxyl functionality pendent to their fatty acid chains. A number of studies have reported introduction of hydroxyl groups at unsaturated sites using various chemical routes. This has been accomplished by hydroformylation followed by hydrogenation, ozonolysis followed by hydrogenation, oxirane ring-opening of epoxidized derivatives, and microbial conversion. Petrović et al. have studied various soybean oil-based polyols. Larock et al. have studied PUDs derived from methoxylated soybean oil polyols of varying functionality and have studied the effect of functionality and hard segment content on film properties. Subramanian et al. have used soy-polyol with primary hydroxyl groups, derived from hydroformylation/reduction followed by polymerization and developed high performance PUDs.

In one aspect, the disclosure relates to a water-dispersible polyurethane polymer (e.g., thermoplastic polymer) composition comprising: (a) hydrophobic soft segments comprising an oligomeric polyether segment comprising 1,2-di-substituted oxyethylene repeating units according to the following Structure I:

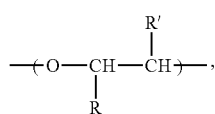
(I)

wherein R and R' are groups resulting from the ring-opening polymerization of epoxidized vegetable oil fatty acid esters; (b) hydrophilic hard segments comprising an ionic group; and optionally (c) chain extending hard segments (e.g., where the chain extending hard segments link prepolymer units comprising a segmented alternating urethane structure, for example via urea (carbamide) groups); wherein: (i) the hydrophobic soft segments and the hydrophilic hard segments in the polyurethane polymer are linked via urethane (carbamate) groups (e.g., in an alternating arrangement between a soft segment and one or more hard segments); and (ii) the polyurethane polymer has a structure capable of forming a dispersion of polyurethane polymer particles in an aqueous medium (e.g., a microphase separation structure). Alternatively or additionally, the 1,2-di-substituted oxyethylene repeating units of the oligomeric polyether segment can be characterized with R and R' being selected from the group consisting of alkyl groups and ester-terminated alkyl groups (e.g., in a given repeating unit, R or R' is the alkyl group and the other is the ester-terminated alkyl group), where the di-substituted oxyethylene repeating units and the corresponding R/R' groups are derived from vegetable oil fatty acid esters.

Various refinements and extensions of the foregoing compositions are possible. For example, the oligomeric polyether segment can comprise a urethane reaction product of a corresponding oligomeric polyether polyol (e.g., with an isocyanate group such as from a diisocyanate compound) according to the following Structure II:

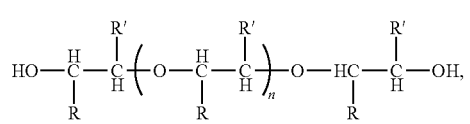
(II)

wherein n+2 represents the number of di-substituted oxyethylene repeating units in the oligomeric polyether segment (e.g., n ranges from about 2 to about 10 to provide the recited oligomeric polyether polyol or corresponding polyether segment with about 4 to about 12 repeating units between isocyanate-derived urethane links). In a refinement, the oligomeric polyether polyol comprises a ring-opening polymerization reaction product of epoxidized vegetable oil fatty acid esters (e.g., a distribution of epoxidized vegetable oil fatty acid esters having varying lengths and degrees of epoxy/oxirane functionality, such as epoxidized soybean oil fatty acid methyl esters). In another refinement, the urethane linking groups between the hydrophobic soft segments and the hydrophilic hard segments are derived from a reaction product of a diisocyanate compound, the oligomeric polyether polyol, and a hydrophilic hard segment precursor comprising a diol compound comprising the ionic group. In another refinement, the ionic groups in the polyurethane polymer are selected from the group from carboxylic acid groups, neutralized carboxylate groups, and combinations thereof. In another refinement, the polyurethane polymer has a hydrophobic soft segment content ranging from 40 wt. % to 60 wt. % relative to the polyurethane polymer. In another refinement, the polyurethane polymer has a bio-based carbon content ranging from 25 wt. % to 70 wt. % relative to the polyurethane polymer.

In another aspect, the disclosure relates to a method for forming a water-dispersible polyurethane polymer according to any of the variously disclosed embodiments, the method comprising: (a) providing a hydrophobic soft segment precursor comprising an oligomeric polyether polyol comprising 1,2-di-substituted oxyethylene repeating units according to the following Structure I:

(I)

wherein R and R' are groups resulting from the ring-opening polymerization of epoxidized vegetable oil fatty acid esters; (b) providing a first hard segment precursor comprising a diisocyanate compound; (c) providing a hydrophilic second hard segment precursor comprising a diol compound comprising a hydrophilic group; (d) reacting the soft segment precursor, the first hard segment precursor, and the second hard segment precursor (e.g., in a suitable solvent for the three reactants), thereby forming a polyurethane prepolymer comprising (i) hydrophobic soft segments and hydrophilic second hard segments linked via urethane (carbamate) group reaction products with the first hard segment precursor and (ii) terminal isocyanate functional groups; and (e) reacting the polyurethane prepolymer with a third hard segment precursor comprising a chain extender (e.g., diamine chain extender forming urea/carbamide links between prepolymer segments), thereby forming a polyurethane polymer having a structure comprising prepolymer units linked via the chain extender and being capable of forming a dispersion of polyurethane polymer particles in an aqueous medium. Alternatively or additionally, the 1,2-di-substituted oxyethylene repeating units of the oligomeric polyether polyol can be characterized with R and R' being (independently) selected from the group consisting of alkyl groups and ester-terminated alkyl groups (e.g., in a given repeating unit, R or R' is the alkyl group and the other is the ester-terminated alkyl group), where the di-substituted oxyethylene repeating units and the corresponding R/R' groups are derived from vegetable oil fatty acid esters.

Various refinements and extensions of the foregoing methods are possible. For example, the oligomeric polyether polyol can comprises a ring-opening polymerization reaction product of an epoxidized vegetable oil fatty acid ester (e.g., soybean oil; methyl or alkyl esters). In a refinement, the oligomeric polyether polyol has a hydroxyl group functionality of 2 or about 2 (e.g., 2 or slightly higher resulting from multiply unsaturated vegetable oil fatty acid esters from which the polyol is derived). In another refinement, the polyurethane polymer has a hydrophobic soft segment content ranging from 40 wt. % to 60 wt. % relative to the polyurethane polymer. In another refinement, the polyurethane polymer has a bio-based carbon content ranging from 25 wt. % to 70 wt. % relative to the polyurethane polymer.

In another aspect, the disclosure relates to a polyurethane polymer dispersion comprising: (a) an aqueous medium comprising water; and (b) the polyurethane polymer according to any of the variously disclosed embodiments stably dispersed in the aqueous medium in the form of polyurethane polymer particles (e.g., poly(urethane/urea) particles when a diamine chain extender is used). In a refinement, the polyurethane polymer particles have a mean particle size ranging from 30 nm to 200 nm. Suitably, the polyurethane polymer has a concentration in the aqueous medium sufficient to form a film upon application of the polyurethane polymer dispersion to a substrate followed by water removal (e.g., drying or other curing process) from the applied polyurethane polymer dispersion.

In another aspect, the disclosure relates to a method for coating a substrate, the method comprising: (a) providing the polyurethane polymer dispersion according to any of the variously disclosed embodiments; (b) applying the polyurethane polymer dispersion to a substrate; and (c) removing water from the applied polyurethane polymer dispersion, thereby forming a film adhered to the substrate, the film comprising the polyurethane polymer.

In another aspect, the disclosure relates to a coated article comprising: (a) a substrate; and (b) the polyurethane polymer according to any of the variously disclosed embodiments adhered to the substrate in the form of a film. Suitably, the polyurethane polymer is thermoplastic and the film is a thermoplastic film formed via hydrogen-bonding interactions between urethane groups and optionally urea groups of the polyurethane polymer.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
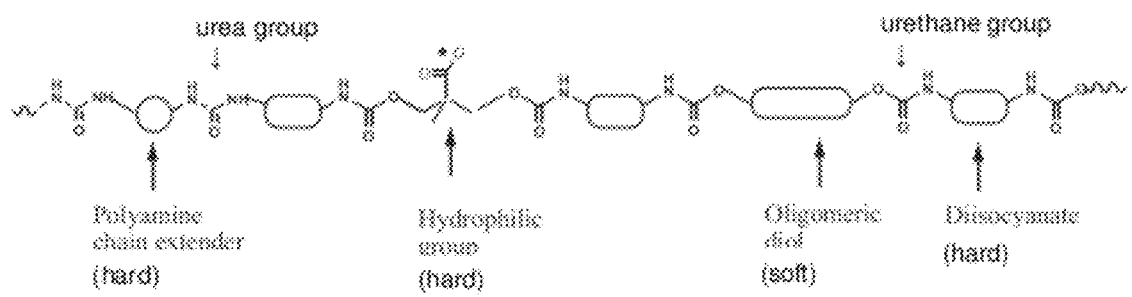
FIG. 1 illustrates an alternating sequence of soft segments (polymeric/oligomeric polyol) and hard segments (urethane group, isocyanate moiety, ionic center, chain extenders) in a generic PUD polymer chain.

While the disclosed processes, compositions, and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The disclosure generally relates to water-dispersible polyurethane polymers (e.g., for use in polyurethane dispersion (PUD) compositions) as well as related methods of making the same, methods of using the same, and articles coated with the same. The water-dispersible polyurethane polymer includes hydrophobic oligomeric polyether soft segments that include 1,2-di-substituted oxyethylene repeating units. The 1,2-di-substituted oxyethylene repeating units are derived from unsaturated fatty acid esters, such as from a distribution of epoxidized vegetable oil fatty acid esters subjected to a ring-opening polymerization process for oligomeric polyether polyol formation. The water-dispersible polyurethane polymer further includes hard segments common to other PUD compositions, including (i) hydrophilic hard segments with an ionic group to promote aqueous dispersion stability, (ii) linking hard segments to provide urethane (carbamate) links between hydrophobic oligomeric polyether soft segments and/or hydrophilic hard segments, and (iii) chain extending hard segments to provide links (e.g., urea (carbamide) links) between prepolymer segments of the hydrophobic soft segments, hydrophilic hard segments, and linking hard segments.

Methods of Forming Water-Dispersible Polyurethane Polymers

The water-dispersible polyurethane polymer according to the disclosure can be formed in a two-step reaction process. In a first step, a hydrophobic soft segment precursor is reacted with one or more hard segment precursors to form a polyurethane prepolymer. The hydrophobic soft segment precursor according to the disclosure includes an oligomeric polyether polyol derived from vegetable oil fatty acid esters. The hard segment precursors in the first step can include a first hard segment precursor as an isocyanate (e.g., diisocyanate) compound and a hydrophilic second hard segment precursor as a polyol (e.g., diol) compound that additionally includes a hydrophilic (e.g., ionic) group. The resulting polyurethane prepolymer includes (i) hydrophobic soft segments and hydrophilic second hard segments linked via urethane (carbamate) group reaction products with the first hard segment precursor and (ii) terminal isocyanate functional groups (e.g., resulting from terminal first hard segment precursors with an unreacted isocyanate group).

In a second step, the polyurethane prepolymer is reacted with an additional chain-extending hard segment precursor. The chain-extending hard segment precursor can be a third hard segment precursor that is reactive with the terminal isocyanate functional groups of the prepolymer (e.g., a diamine or polyamine chain extender forming urea/carbamide links between prepolymer segments). The resulting polyurethane polymer has a structure with polyurethane prepolymer units linked via the chain extender and is capable of forming a dispersion of polyurethane polymer particles in an aqueous medium.

Oligomeric Polyether Polyol

The oligomeric polyether polyol includes 1,2-di-substituted oxyethylene repeating units derived from vegetable oil fatty acid esters. In an embodiment, the 1,2-di-substituted oxyethylene repeating units can be characterized by the following Structure I:

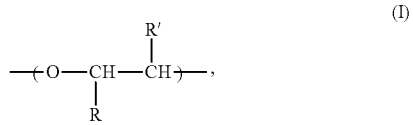

In Structure I, R and R' are groups characteristic of the vegetable oil fatty acid ester from which the repeating unit was derived. As illustrated in the examples, the oligomeric polyether polyol and corresponding oxyethylene repeating units can resulting from the ring-opening polymerization of epoxidized vegetable oil fatty acid esters. For example, the R and R' groups are derived from vegetable oil fatty acid esters and can be independently alkyl groups or ester-terminated alkyl groups (e.g., in a given repeating unit, R or R' is the alkyl group and the other is the ester-terminated alkyl group, but there is not necessarily a head-to-tail alternating selectivity between adjacent repeating units). The alkyl groups (e.g., alkyl groups alone or ester-terminated alkyl groups) attached to the oxyethylene carbons typically contain 1 to 10 (e.g., at least 2, 4, 6, or 8 and/or up to 4, 6, 8, or 10) carbon atoms depending on the fatty acid chain position of the epoxy group in the fatty acid ester (or the original carbon-carbon double bond in the unsaturated fatty acid ester that was converted to an epoxy group). The ester group terminating one of the alkyl groups is suitably a methyl group, but more generally can be another alkyl group with 1 to 10 carbon atoms. In some embodiments, either or both of the R/R' groups can incorporate some degree of branching in the form of an additional oxyethylene and/or corresponding hydroxyl group functionality (e.g., when the original epoxidized fatty acid ester contains multiple epoxy groups; such as where the R and/or R' groups retain their basic alkyl or ester-terminated alkyl functionality, but with additional hydroxyl group(s) resulting from additional ring-opened epoxy groups on the R/R' side chains).

A representative structure for the oligomeric polyether polyol incorporating the 1,2-di-substituted oxyethylene repeating units of Structure I is given by Structure II:

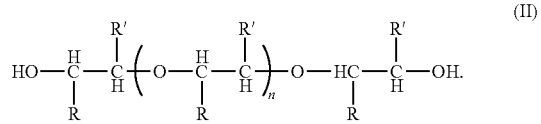

In Structure II, n+2 represents the number of 1,2-di-substituted oxyethylene repeating units in the oligomeric polyether polyol (or, equivalently, the oligomeric polyether segment in the polyurethane prepolymer and the final polyurethane polymer). Specifically, there are n interior oxyethylene repeating units and two terminal oxyethylene units with a hydroxy group providing the polyol functionality for urethane linking via an isocyanate reaction product. As illustrated in Structure II, the terminal hydroxy groups in the oligomeric polyether polyol are secondary hydroxy groups resulting from the ring-opening polymerization of a non-terminal epoxy group from the epoxidized fatty acid ester monomer reactant. Similarly, additional hydroxy groups that may be present on some R/R' side chains (e.g., due to branching resulting from higher functionality epoxidized fatty acid ester monomers) are generally secondary hydroxy groups. In an embodiment, all or substantially all of the hydroxy groups in the oligomeric polyether polyol are secondary hydroxy groups (e.g., the oligomeric polyether polyol ring-opening polymerization product can be used without further processing, such as where the ester-terminal groups of R/R' remain intact and need not be reduced or otherwise converted to primary alcohol functionalities). Analogously, the urethane links between the 1,2-di-substituted oxyethylene repeating units and other segments in the polyurethane prepolymer or polymer are characterized in that the carbon atom from the 1,2-di-substituted oxyethylene repeating unit and linked via the urethane group has only one hydrogen atom directly bonded to it. In various embodiments, suitable oligomeric values for n can be at least 0 (e.g., a dimer according to the structure shown in Structure II), 1, 2, 3, 4, or 5 and/or up to about 5, 6, 7, 8, 10, or 12. The specific alkyl and ester-terminated alkyl groups for R and R' need not be the same in each repeating unit, as different epoxidized vegetable oil ester species from a given distribution can react to form a given oligomeric polyether polyol.

The oligomeric polyether polyol can be a ring-opening polymerization reaction product of an epoxidized vegetable oil fatty acid ester. The ring-opening polymerization reaction can be performed under conditions generally known in the art, for example by reaction with an acid at moderate temperatures as illustrated in the examples. The epoxidized vegetable oil fatty acid ester is generally commercially available as a transesterification and epoxidization product of a natural vegetable oil triglyceride (i.e., containing three fatty acid residues for epoxidization and conversion to monoesters, for example methyl esters or more generally alkyl esters with 1 to 10 carbon atoms in the ester group). The epoxidized vegetable oil fatty acid ester thus is generally a distribution of multiple epoxidized vegetable oil fatty acid ester species having differing chain lengths, differing positioning of the epoxy groups on the chains, and differing numbers of epoxy groups per chain. Suitably, the epoxidized vegetable oil fatty acid ester has an epoxy functionality (i.e., epoxy groups per fatty acid chain) close to 1 to limit branching and the formation of branched oligomeric polyether polyols with three or more hydroxy groups. Commonly available epoxidized vegetable oil fatty acid esters have epoxy functionalities of at least 1, 1.2, or 1.4 and/or up to 1.2, 1.4, or 1.6.

The oligomeric polyether polyol suitably has a hydroxyl group functionality of 2 or about 2 (e.g., 2 or higher). A functionality of 2 (e.g., as illustrated in Structure II above, assuming no branching or additional hydroxyl functionality in the R and R' groups) is suitable to permit polyurethane prepolymer formation without substantial crosslinking or gelation, thus allowing the formation of an eventual thermoplastic polyurethane polymer. In some embodiments, the functionality may be higher than 2 (e.g., at least 2, 2.1 or 2.2 and/or up to 2.2, 2.4, or 2.6) for some oligomeric polyether polyols because of multiple unsaturations in the fatty acids from which multiple epoxide groups can be present per fatty acid chain. As noted, this can provide a oligomeric polyether polyol as generally shown in Structure II, but where one (or more) of the R/R' groups provides a branched oligomeric polyether polyol. In this case, the molar ratio of isocyanate groups (NCO) to hydroxyl groups (OH) in the prepolymer formation step can be selected (e.g., reduced) to limit or prevent undesired crosslinking.

The vegetable oil triglyceride from which the epoxidized vegetable oil fatty acid ester is derived is not particularly limited and can include, for example, one or more of soybean oil, safflower oil, linseed oil, corn oil, sunflower oil, olive oil, canola oil, sesame oil, cottonseed oil, palm oil, peanut oil, coconut oil, rapeseed oil, tung oil, castor oil, almond oil, flaxseed oil, grape seed oil, olive oil, safflower oil, sunflower oil, and walnut oil.

Isocyanate Compound

Suitable isocyanates useable as a first hard segment precursor include any organic compound having at least two free isocyanate groups per molecule, for example having about 4 to 20 carbon atoms (in addition to nitrogen, oxygen, and hydrogen) and including aliphatic, cycloaliphatic, aryl-aliphatic, and aromatic polyisocyanates, as well as products of their oligomerization, used alone or in mixtures of two or more. Suitable isocyanates are diisocyanate compounds, for example having the general form $X(NCO)_2$, with X representing a bivalent aliphatic hydrocarbon group having from 4 to 12 carbon atoms, a bivalent cycloaliphatic hydrocarbon group having from 6 to 15 carbon atoms, a bivalent aromatic hydrocarbon group having from 6 to 15 carbon atoms or a bivalent aryl-aliphatic hydrocarbon group having from 7 to 15 carbon atoms.

Specific examples of suitable aliphatic polyisocyanates include alpha, omega-alkylene diisocyanates having from 4 to 20 carbon atoms, such as hexamethylene-1,6-diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Specific examples of suitable cycloaliphatic polyisocyanates include dicyclohexylmethane diisocyanate, isophorone diisocyanate (IPDI), 1,4-cyclohexane diisocyanate, 1,3-bis-(isocyanatomethyl)cyclohexane, and the like. Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. Examples of suitable aromatic polyisocyanates include 4,4'-diphenylmethylene diisocyanate (MDI) and its isomers, toluene diisocyanate (TDI) and its isomers, naphthalene diisocyanate, their oligomeric forms and the like.

Hydrophilic Polyol Compound

Suitable hydrophilic polyol compounds useable as the second hard segment precursor can be organic polyol or diol compounds that additionally include a hydrophilic/ionic group such as a carboxylate group (e.g., in carboxylic acid form or as a salt). Examples of suitable hydroxy carboxylic acids used as the hydrophilic polyol compound to form the isocyanate terminated polyurethane prepolymer can be represented by formula $(HO)_xR^*(COOH)_y$, where $R^*$ represents a straight or branched hydrocarbon group containing 1 to 12 carbon atoms, and x and y independently can be 1, 2, or 3 (e.g., x=2 and y=1 for a diol with single carboxylic acid ionic group). The hydroxy carboxylic acids can be α,α-dimethylol alkanoic acids, for example including such compounds as 2,2-dimethylolacetic acid, 2,2-dimethylolpropionic acid (DMPA), 2,2-dimethylolbutyric acid (DMBA) and 2,2-dimethylolpentanic acid.

The acid groups of the resulting polyurethane polymer or prepolymer can be neutralized using a suitable neutralizing agent. Suitable neutralizing agents include, but are not limited to amines and/or alkali metal hydroxides. In a particular embodiment, the amine neutralizing agent can be a tertiary amine such as N-methyl morpholine, trimethyl amine, triethylamine, triethanol amine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine, N,N-dimethylbenzylamine, and combinations thereof.

Chain Extender

Suitable chain extenders useable as the third hard segment precursor can be water-soluble compounds, as these increase the dispersibility of the polyurethane polymer end product in water. Organic diamines, which form urea/carbamide links between prepolymer segments, are suitably used as chain extenders because they generally provide an increase in molecular weight without causing gelling of the polyurethane dispersion. Useful chain extenders include aliphatic, cycloaliphatic, and aromatic diamines. Examples of suitable diamines are ethylenediamine (EDA), propylenediamine, 1,4-butylenediamine, piperazine, 1,4-cyclohexyldimethyldiamine, hexamethylenediamine (HDI), N-methylpropylenediamine, diaminophenylsulfone, diaminodiphenylether, diaminodiphenyldimethylmethane, 2,4-diamino-6-phenyltriazine, isophoronediamine, dimer fatty acid diamine, N-isodecycloxy propyl-1,3-diaminopropane and imidazolidinone functional diamines. In other embodiments, the chain extender can be a di-functional compound with functional groups other than amino groups but which are reactive with the terminal isocyanate groups of the prepolymer and are capable of forming the polyurethane polymer (e.g., such as alkylene diols that form urethane links between prepolymer units).

Prepolymer and Polymer Formation

The reaction steps forming the polyurethane prepolymer and subsequent polymer can be performed under conditions generally known in the art, for example by in a suitable solvent for the reaction components under moderate heating and optionally in the presence of a catalyst. The polyurethane prepolymer is desirably formed in the presence of a water-compatible solvent such as 1-methyl-2-pyrrolidone (NMP), dipropylene glycol methyl ether acetate (DPMA), and/or acetone. Once the prepolymer is formed, the hydrophilic hard segment ionic groups can be neutralized to a desired degree and then the chain extender can be added to the reaction mixture for polymer formation. In the case where NMP or DPMA is used, the amount of solvent used is suitably in the range of 3-15% of the final polyurethane polymer. In the case where acetone is used, the acetone can be distilled off so that the final level of acetone may be as little as 1.0% or even less without disrupting the stability of the resulting dispersion. The molar ratios of the various polymer components (soft and hard segment precursors) can be selected as desired to control the molecular weight and relative component amount (e.g., weight or mole fraction of a particular soft or hard segment component relative to the whole) in the polyurethane prepolymer and polymer. In an embodiment, the soft segment precursor, the first hard segment precursor, and the second hard segment precursor are selected so that an initial ratio of isocyanate groups to hydroxyl groups ranges from 1.2 or 1.25 to 1.5 or 1.7 (e.g., about 1.5).

Water-Dispersible Polyurethane Polymer Compositions

The foregoing methods can be used to form a water-dispersible polyurethane polymer according to the disclosure. As analogously described above, the water-dispersible polyurethane polymer is suitably a thermoplastic polymer that includes hydrophobic oligomeric polyether soft segments and hydrophilic hard segments including an ionic group (e.g., carboxylic acid groups, neutralized carboxylate groups, and combinations thereof). The oligomeric polyether segments include 1,2-di-substituted oxyethylene repeating units as described and illustrated above. As illustrated in FIG. 1, the hydrophobic soft segments (shown as an "oligomeric diol") and the hydrophilic hard segments in the polyurethane polymer are linked via urethane (carbamate) groups (e.g., derived from isocyanate/hydroxy reaction products; resulting in prepolymer segments containing alternating soft and hard segments, where multiple hard segments are possible in succession before alternating to a soft segment). The polyurethane polymer has a structure (e.g., a microphase separation structure) that is capable of forming a dispersion of polyurethane polymer particles in an aqueous medium. The polyurethane polymer can further include chain extending hard segments that link prepolymer units (e.g., via urea (carbamide) groups) having a segmented alternating urethane structure.

The relative amounts of the soft segments (e.g., oligomeric polyether segments derived from vegetable oil fatty acid esters) and hard segments (e.g., ionic groups, urethane linkers, and chain extenders) can be selected as desired based on desired end-use properties. Suitably, the polyurethane polymer has a hydrophobic soft segment content (e.g., a hydrophobic oligomeric polyether soft segment content) of at least 20 wt. %, 40 wt. %, or 50 wt. % and/or up to 50 wt. %, 60 wt. %, or 70 wt. % relative to the polyurethane polymer. Accordingly, the polyurethane polymer can have a hard segment content of at least 30 wt. %, 40 wt. %, or 50 wt. % and/or up to 50 wt. %, 60 wt. %, or 80 wt. % relative to the polyurethane polymer with any desired distribution among the various hard segment components. Similarly, the polyurethane polymer can have a bio-based carbon content of at least 25 wt. %, 50 wt. %, or 60 wt. % and/or up to 50 wt. %, 60 wt. %, or 70 wt. % relative to the polyurethane polymer. For the disclosed polyurethane polymer, the oligomeric polyether segments derived from vegetable oil fatty acid esters contribute to the bio-based carbon content, while carbon present from non-renewable sources (e.g., from the various hard segments) does not contribute to the bio-based carbon content.

The polyurethane polymer according to the disclosure suitably can be in the form of a dispersion for forming various films and/or coatings. The polyurethane polymer in any of the various embodiments can be incorporated into an aqueous medium in the form of polyurethane polymer particles (e.g., poly(urethane/urea) particles when an amine-functional chain extender is used). The particle size can be selected for a given application and can be controlled depending on the relative amount of the hydrophilic component in the polymer and degree of neutralization of the hydrophilic component. Suitably, the polyurethane polymer particles can have a mean particle size of at least 30 nm, 70 nm, 200 nm, or 250 nm and/or up to 200 nm or 300 nm.

The aqueous dispersion can have any suitable polyurethane polymer (solids) content. Suitably, the polyurethane polymer has a concentration in the aqueous medium sufficient to form a film upon application of the polyurethane polymer dispersion to a substrate followed by water removal from the applied polyurethane polymer dispersion. For example, the dispersion can have a polyurethane polymer content of at least 5 wt. %, 10 wt. %, 15 wt. %, 20 wt. %, or 25 wt. % and/or up to 40 wt. %, 50 wt. %, 60 wt. %, or 70 wt. % relative to the dispersion weight. The specific polyurethane polymer level can also be selected based on the composition of the dispersed polyurethane as well as the particle size of the dispersed particles (e.g., to avoid a film with poor coating properties at low concentrations and to avoid overly viscous dispersions at high concentrations).

The disclosure further relates to a method for coating a substrate in which a polyurethane polymer dispersion according to any desired embodiment is applied to a substrate, followed by removal of water from the applied polyurethane polymer dispersion (e.g., via drying with or without applied heat). The resulting film formed is adhered to the substrate, for example as a thermoplastic film formed via hydrogen-bonding interactions between urethane groups (and optionally urea groups when present) of the polyurethane polymer. The substrate to which the dispersion and eventual film are applied is not particularly limited, for example including wood, paper, metal (e.g., steel, aluminum), plastics, concrete, glass, and leather. The resulting film-coated article exhibits a combination of film hardness, flexibility, water and abrasion resistance, and solvent resistance.

EXAMPLES

The following examples illustrate the disclosed processes and compositions, but are not intended to limit the scope of any claims thereto.

Example 1

PUD Composition using Soybean Oil-Derived Oligomeric Polyether Polyol

This example discloses an oligomeric polyether polyol derived from soybean oil (soy-polyol) by a single-step low energy intensive process. Polyurethane dispersions based on this soy-polyol, with bio-based content of up to about 60% have been prepared using conventional prepolymer process. Films of PUDs have been characterized for physical and mechanical properties. The PUDs have a high bio-based content, an ease of processing, versatility, and excellent performance properties.

The soy-polyol has a controlled chemical structure, molecular weight, and functionality for use as soft segments of thermoplastic PUDs. The goal was to derive high performance PUDs with bio-base content of up to 60%, without significant change in processing steps. The example also explores the blending bio-base polyol with a conventional petro-based polyester. The soy-polyol (polyether polyol type), with a controlled molecular weight and functionality, has been synthesized from epoxidized soy fatty acid methyl ester (ESFAME), which includes a distribution of species having various fatty acid chain lengths, number of epoxy groups per fatty acid chain, and positions of the epoxy group(s) on the fatty acid chain. A series of PUDs containing varying amounts of soy-polyol has been prepared containing up to 50% bio-based content. For comparison, a conventional PUD based on polyester-diol has also been prepared. PUDs, based on combination of polyester-diol and soy-polyol have also been prepared to explore feasibility of preparing such PUDs and study their performance. Various physical and mechanical and chemical properties of coatings based on these PUDs have been studied and compared.

Materials and Methods:

Epoxidized Soy Fatty acid methyl ester (ESFAME) was procured from Arkema (VIKOFLEX-7010, % oxirane content=7), and used without any purification. Dimethylolpropionic acid was procured from Perstorp (Bis-MPA). Isophorone diisocyanate (IPDI), ethylenediamine (EDA), triethyleneamine (TEA), fluoroboric acid solution, diethyl ether and other common reagents and chemicals were purchased from Sigma Aldrich, USA.

Intermediates, products and coatings were characterized using ASTM methods where applicable: % oxirane content (ASTM D-165297), Acid number (ASTM D-1639-96), hydroxyl number (ASTM D-4274-99), Water resistance (ASTM D-870-02), Pencil hardness (ASTM D-3363), impact resistance (ASTM D-2794-99), Adhesion (cross-cut) test (ASTM D-3359-02), and MEK double rub test (ASTM D-4752-98). Functional group characterization of the soy-polyol was done recording Fourier Transform Infrared (FTIR) spectra with Bruker Tensor 27 FTIR analyzer in the range of 400-4000 cm$^{-1}$ at room temperature.

All the PUDs were characterized for mean particle size using a Brookhaven 90PLUS particle size analyzer. In this technique particle size can be analyzed using random intensity fluctuations obtained from Brownian motion of colloidal particles. Thermo-gravimetric analysis of samples was carried out using TGA Q500-TA instrument in the temperature range of 25° C. to 550° C. at the rate of 10° C./min. Glass transition temperatures $T_g$ of all PUDs were determined by Differential Scanning Calorimetry (DSC), (DSC Q2000-TA instrument). Typically about 6 mg of the test samples were weighed in an aluminum pan and sealed with pin perforated lids. Data were recorded while the oven temperature was raised from –80° C. to 150° C. at a rate of 20° C./min. The DSC oven was purged with nitrogen at 50 mL/min while testing.

Coatings were characterized, besides routine film properties, for their mechanical properties using nanohardness tester (NANO-INDENTER XP from MTS Corporation). In this test, a diamond indenter tip was forced into the cured film being studied under continuous conditions. The indentations to the depth of 2000 nm were made using continuous load. Multiple indentations (9 indentations per sample) were made at different locations of the film surface at applied load. The load-displacement curve was recorded, from which effective hardness and modulus could be calculated.

Figure 2:
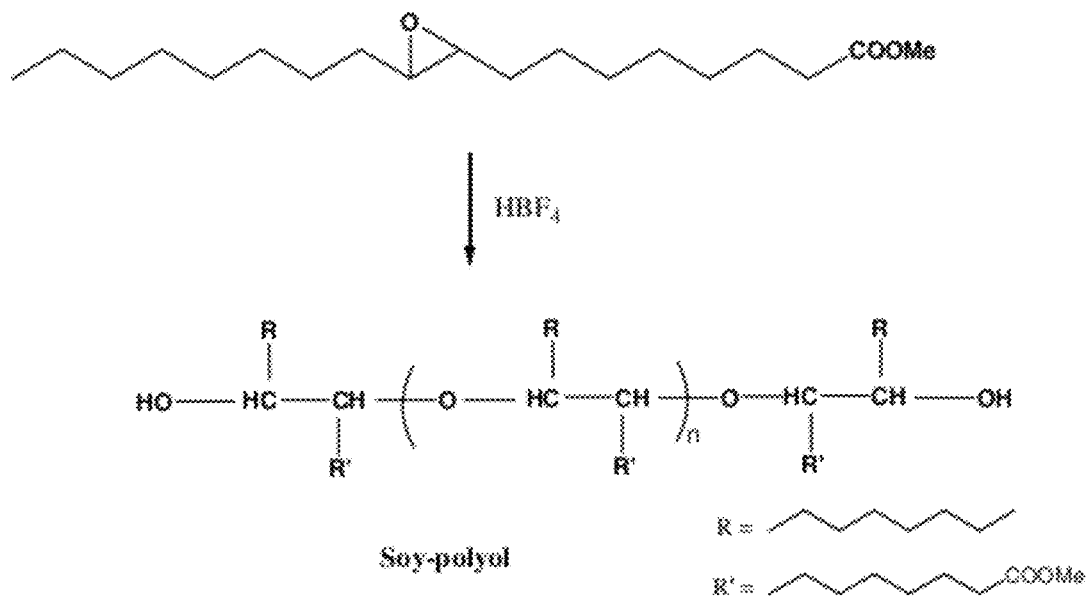
FIG. 2 illustrates a scheme for forming an oligomeric polyether polyol derived from an epoxidized vegetable oil fatty acid ester according to the disclosure.

Synthesis of Soy-Polyol (SP):

250 g of ESFAME was placed into a 500 ml, 3-neck reaction flask attached with a mechanical stirrer, a pressure-equalized dropping funnel, an inlet for dry nitrogen gas, and a thermometer probe. A 48% aqueous solution of fluroboric acid (HBF$_4$), 0.3-3% by wt. of ESFAME, was placed into a pressure-equalized dropping funnel. Reaction flask was heated to 40° C. and HBF$_4$ solution was added slowly for 10-20 min. under gentle stirring, maintaining reaction temperature <70° C. After addition of HBF$_4$ solution was complete, reaction was continued for 3 hrs. at 40-50° C., and sample of reaction mixture was drawn and tested for % oxirane oxygen content (% OOC) as per ASTM D-1652-04. Reaction was continued until % OOC dropped below 0.2%. Product was characterized for viscosity, Acid number and hydroxyl number (ASTM D 4274-05) and stored in air-tight glass jar. The product, soy-polyol, was used for preparation of PUDs without further purification. FIG. 2 shows simplified schematic reaction scheme for synthesis of soy-polyol from ESFAME (e.g., where the distribution of different ESFAME species used is illustrated as a single 18-carbon fatty acid methyl ester with a single epoxy group).

Preparation of Aqueous Polyurethane Dispersions:

Into a 500 ml, 3-necked reaction flask attached with a mechanical stirrer, a water-condenser, and inlet for nitrogen gas, was placed dimethylolpropionic acid, soy-polyol, (standard polyester polyol where required), NMP (5% by wt. of final PUD), dry acetone (20-25% by wt of prepolymer), and dibutyltin dilaurate catalyst (0.01% of prepolymer). Reaction mixture was heated to 40-50° C. under slow stirring, until all DMPA was dissolved. Reaction temperature was then brought to acetone reflux condition (55-60° C.) and IPDI was added slowly from pressure-equalized dropping funnel, for 30-45 min. After the addition of IPDI was complete, reaction mixture was stirred for 3 hrs at 50-55° C. A sample of reaction mixture was drawn at each 30 min. interval and tested for % isocyanate content (% NCO) (ASTM D 2572-97) method. When desired % NCO was reached, reaction mixture was cooled to 40° C., calculated amount of triethylamine (neutralizer) was added (degree of neutralization about 90%) and mixture was stirred for 20 minutes. Heating was then discontinued and reaction mixture was brought to room temperature and pre-polymer was transferred to 1000 ml glass beaker.

Figure 3:
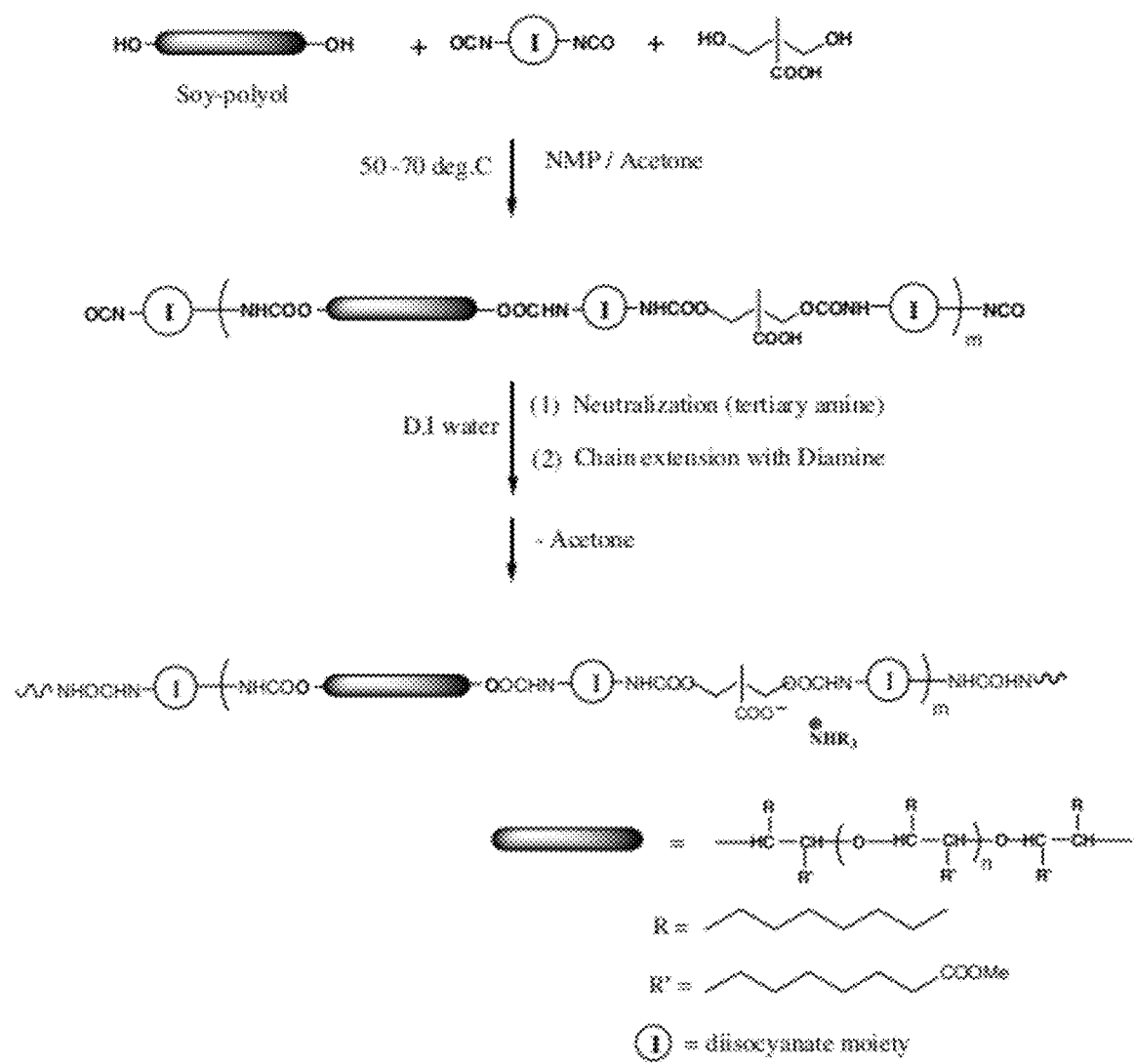
FIG. 3 illustrates a scheme for forming a water-dispersible polyurethane polymer according to the disclosure.

The mixture was stirred under a high-speed disc disperser at 15000 rpm (Dispermat). DI water containing ethylenediamine (chain extender), was added slowly for 30 min. in a thin stream directed at the center of the impeller blade. When addition of water was complete, stirring was continued for additional 30 min. The white opalescent product was then transferred into a rotary vacuum evaporator and acetone was removed under vacuum at 40-45° C. When acetone removal was complete (determined by % non-volatile content), product was cooled to room temperature and stored in a glass jar. FIG. 3 shows a simplified general reaction scheme for preparation of PUD based on soy-polyol. Table-1 shows compositions of PUDs used in the present study.

Results-Synthesis of Soy-Polyol:

As stated earlier, there are number of chemistries available to prepare vegetable oil based polyol that can produce polyols with varying type and amount of —OH content, functionality, viscosity and chemical structure. The requirements of such polyols were considered from the standpoint of their suitability as components (soft segment) of PUDs and performance needs of their end products. Among the key desirable attributes identified are: (a) low viscosity, (b) functionality of ~2, (c) high hydrophobicity, and (d) high bio-based content. Polyols with low viscosity allows for low viscosity prepolymer, which turn produces aqueous dispersions with lower particle size and hence stability. Lower viscosity of prepolymer is also desirable since it would need less organic solvent for efficient processing. Polyols with functionality ~2 are most suitable since they allow attainment if high molecular weight without cross-linking during the chain extension step. PUDs are expected to have good hydrolytic stability and must resist hydrolysis during storage. Also, their films must have adequate water resistance for general durability. Polyols with greater hydrophobicity are known to produce coatings with better water resistance and hydrolytic stability. For sustainable development, high bio-based content is highly desirable of polyols since they make up significant part of PUDs.

The soy-polyol was designed in keeping with all of the above criteria and selected synthetic procedure that requires simple and low energy intensive steps. Cationic ring-opening polymerization of epoxidized soy fatty acid methyl ester (ESFAME) using a super-acid catalyst HBF$_6$ was thought to be an appropriate synthetic route. Lligadas et al. synthesized a higher functional polyol from epoxidized vegetable oil fatty acid methyl ester using HSbF$_6$ catalyst, using a similar process. The oligomerization reaction was monitored by following % oxirane content as well as by FTIR spectroscopy, which showed a decrease in the absorption centered at 836 cm$^{-1}$, corresponding to an oxirane ring, and finally disappeared. An increase in the absorption at 1088 cm$^{-1}$ (C—O—C ether) and in the broad band around 3400-3500 cm$^{-1}$ (OH hydroxyl group) was also noticed. This indicated that oxirane ring opening took place to form ether linkages and formation of hydroxyl groups. The resulted soy-polyol was clear, yellow, viscous oil, having —OH number 88 (mgs of KOH per g), viscosity 6200 cPs (at 25° C.), hydroxyl equivalent wt. of 637.5 g. The number average molecular wt. (GPC) was found to be 1250 g with polydispersity index of 2.8.

Results-Polyurethane Dispersion:

As shown in Table-1, four polyurethane dispersions were prepared using a modified isocyanate prepolymer process. PUD-1 is based on soy-polyol as the sole soft segment. PUD-2 is based solely on a standard commercial polyester-diol (OH#=230 mgs of KOH). PUD-3 used a combination (50% by wt. each) of soy-polyol and standard polyester diol. PUD-1, PUD-2, and PUD-3 were prepared by keeping NCO/OH equivalent ratio of 1.5 for their isocyanate prepolymers. PUD-4 is based solely on soy-polyol but it used NCO/OH of 1.25 for its prepolymer to incorporate much higher amount of soft segment (and less chain extension). NMP was used at about 5% by wt. of final PUD to facilitate processing. Acetone was also used to reduce solution viscosity of prepolymers prior to their dispersion. For all PUDs, the calculated amount of DMPA was used such that the acid number of their prepolymers was 30-35 mgs of KOH/g. TEA was used as neutralizing amine and degree of neutralization of 90% was used for all the prepolymers.

TABLE 1

Composition of PUDs

| Identity | Polyol type | Prepolymer NCO/OH mole ratio | Soft Segment SS (% by wt.) | Hard Segment HS (% by wt.) | Bio-based Content % |
|---|---|---|---|---|---|
| PUD-1 | Soy-polyol | 1.50 | 52.5 | 47.5 | 61.7 |
| PUD-2 | Std. Polyester diol | 1.50 | 38.8 | 61.2 | 0 |
| PUD-3 | Soy-polyol + Std. polyesterdiol | 1.50 | 43.9 | 56.1 | 28.8 |
| PUD-4 | Soy-polyol (low chain extender) | 1.25 | 58.2 | 41.9 | 65.8 |

All the PUDs so obtained were white opaque dispersions and did not show any instability on accelerated storage test (incubation test for 6 weeks at 50° C.). Bio-based content of all PUDs have been calculated based on their non-volatile compositions using following formula.

$$\% \text{ Bio-based content} = \frac{\text{Amount of bio-based carbon}}{\text{Amount of bio-based carbon} + \text{amount of fossil carbon}} \times 100$$

Film Properties of PUDs:

Table-2 shows film properties of PUDs casted on steel panels. All properties were tested after 168 hrs of drying under ambient conditions. Comparison of film properties PUD-1 (Soy-polyol) and PUD-2 (polyester polyol) shows significant difference in their pendulum hardness, and impact resistance properties. The higher impact resistance and greater pendulum can be attributed to the short chain polyester structure (hard structure) as soft segment of PUD-2, compared to long chain polyether (flexible structure) as soft segment in PUD-1. Also, the % hard segment in PUD-2 is higher than that of PUD-1. PUD-3 has comparable properties with that of PUD-1 but with slightly improved toughness. The glass transition temperature $T_g$ measured by DSC show expected results where $T_g$ of PUD-3 (combination of soy-polyol+polyester diol) is 20.3° C., that is intermediate to that for PUD-1 and PUD-2. $T_g$ results appears to be consistent with the results of pendulum hardness as well has hardness measured by nano-indentation test. PUD-1 has much greater soft segment content (52.5%) compared to that of PUD-2 (38.8%). This indicates that relatively rigid polyester segment is responsible for higher $T_g$, and hence hardness and impact resistance, compared to much flexible polyether segment, at equal wt. %. In other words, to achieve a desired hardness/impact resistance (and $T_g$) much less content of soy-polyol is needed compared to that of a conventional polyester. This observation is consistent with the flexible structure of soy-polyol and presence of C—O—C linkages.

PUD-4 is based on soy-polyol and has significantly higher (58.2%) soft segment content compared to PUD-1. The pendulum hardness and pencil hardness of its film is poor compared to PUD-1. Significantly lower $T_g$ of PUD-4 is consistent with its other film properties. Lower numbers for both direct and reverse impact can also be explained based on their very low $T_g$ which could not resist to rapid deformation to load greater than 90 lbs. inch. Differential Scanning Calorimetry (DSC) was used to determine the $T_g$ values in Table-2. Adhesions of all the films are generally good, which is characteristic feature of polyurethane coatings.

TABLE 2

Film Properties of PUDs

| Identity | Description (Soft segment) composition | Pendulum Hardness (Koening) (7 days – (1 day)) | Pencil Hardness | Impact Resistance D/R (lbs. inch) | Adhesion Cross-cut | $T_g$ (by DSC) ° C. |
|---|---|---|---|---|---|---|
| PUD-1 | Soy-polyol | 106.4 (96.6) | 2H | 120/120 | 5B | 18.5 |
| PUD-2 | Std. Polyester diol | 196 (154) | 2H | 160/140 | 5B | 23.6 |
| PUD-3 | Soy-polyol + Polyesterdiol | 100.8 (72.8) | 2H | 140/120 | 4B | 20.3 |
| PUD-4 | Soy-polyol (low chain extender) | 43.4 (35) | 3B | 90/80 | 5B | −28.6 |

Effect of Soy-Polyol Content on Hydrophobicity:

Soy-polyol, due to its chemical structure comprising of non-polar aliphatic fatty acid chains and presence of C—O—C ether linkages is expected contribute hydrophobic character to PUD films. Water-contact angle measurement is a good measure of surface hydrophobicity of coatings. PUD films with varying soy-polyol content were characterized for static water-contact angle measurements. Table-3 shows water-contact angles (averages of 5 results with accuracy of ±1° of all PUD films. The results clearly show that for PUD-1 through PUD-3, as soy-polyol content in the film increases, surface hydrophobicity of their films increases as indicated by increase in their water-contact angles. For PUD-4, however, despite much higher soy-polyol content its water-contact angle is comparable to that of PUD-1. This indicates that there exists a maximum hydrophobicity achievable at a critical amount of soy-polyol, above which no further increase is observed. Hydrophobicity of polymer is also known to influence the average particle size of their aqueous dispersion. As shown in Table-3, for PUD-1 through PUD-3, as soy-polyol content increases the particle size of their dispersion increases. Thus, there appears to be a good correlation between hydrophobicity of polymer and particle size of their dispersion. PUD-4, however, shows much lower particle size despite its higher soy-polyol content. This can be attributed to its lower molecular weight, because of lower amount of chain extender amine content, resulting from NCO/OH=1.25 of its prepolymer compared to that of 1.5 for PUD-1 through PUD-3.

Figure 4:
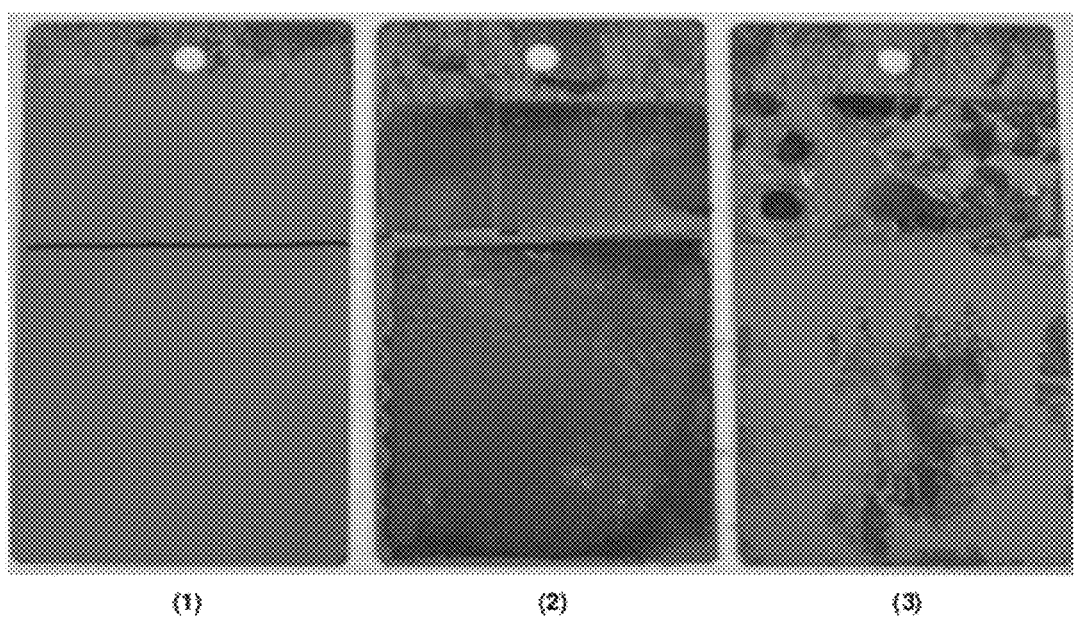
FIG. 4 illustrates the results of a water resistance test as applied to film-coated substrate with various polyurethane films (1: PUD-1, 2: PUD-2, and 3: PUD-3 from Example 1 after immersion).

PUD films were also subjected to water-resistance test. The results of water resistance test clearly corroborate with hydrophobicity of the films. Water-resistance test was performed in accordance with ASTM-D 870-02. The prepared coating samples were immersed in water for 24 hrs followed by visual rating. The results of water resistance and acid-resistance tests are reported in Table-3. FIG. 4 presents photographic images of films of PUD-1 through PUD-3, after water-resistance test. As can be seen in FIG. 4, PUD-1 based on soy-polyol show excellent water resistance properties compared to PUD-2 films that is based on polyesters. PUD-3 shows moderate water resistance. Poor performance of PUD-2 can be attributed to the presence of significant number of hydrolysable ester groups, and lower hydrophobicity of their films.

Figure 5:
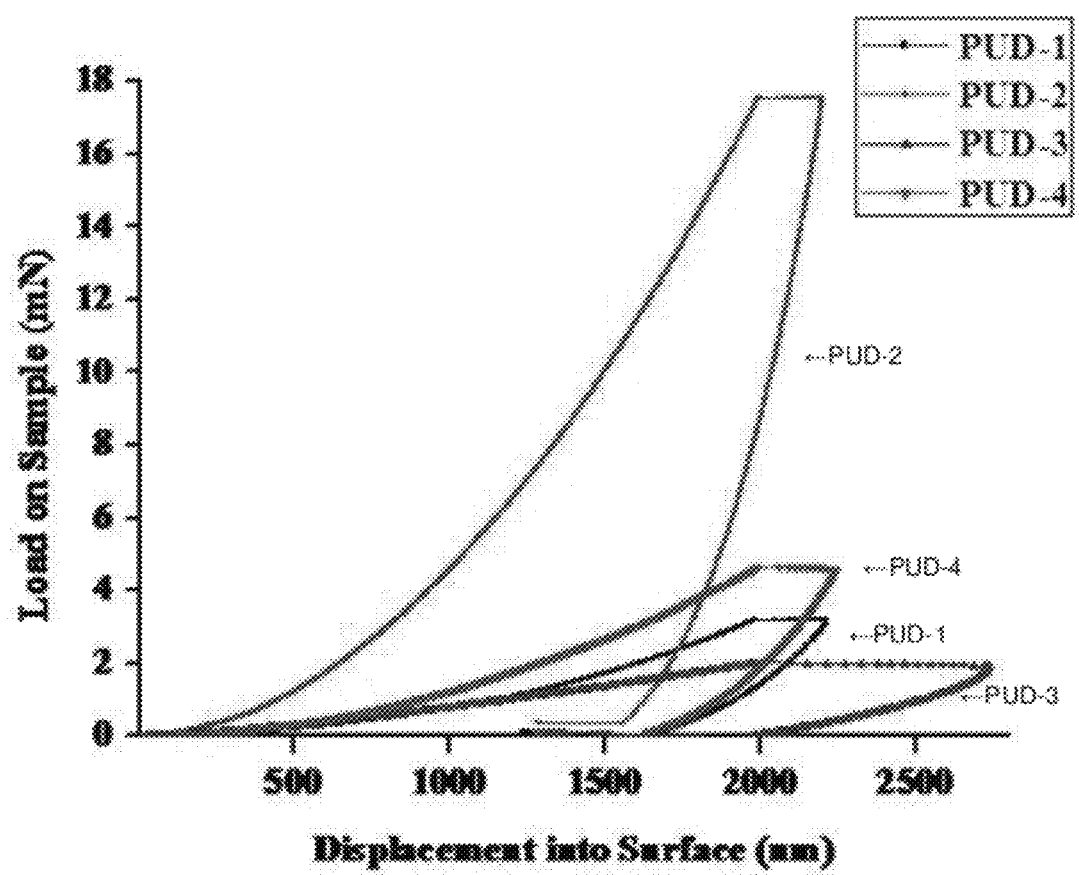
FIG. 5 includes a graph illustrating the results of a nanoindentation test for polyurethane films formed in Example 1.
Figure 6:
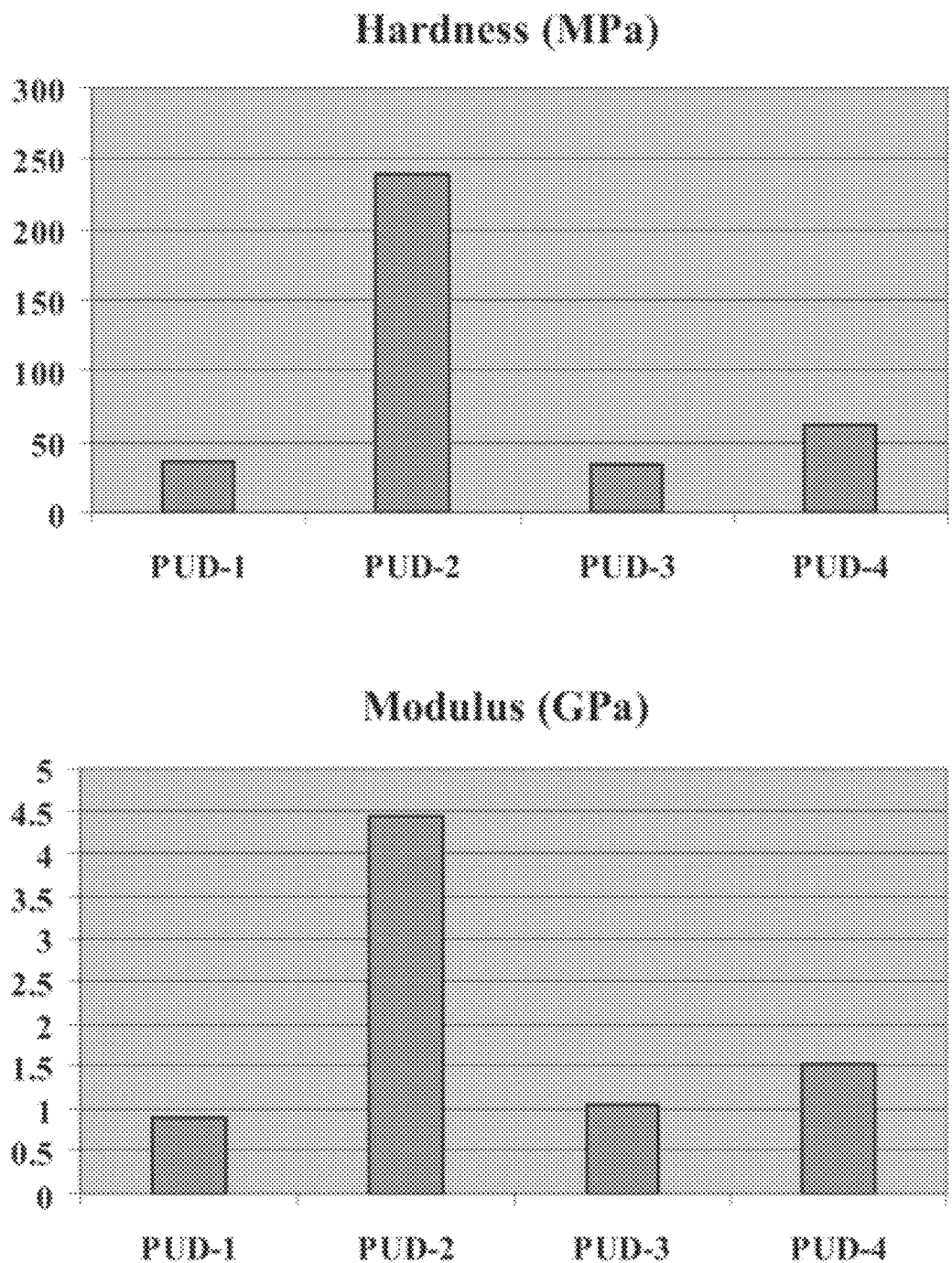
FIG. 6 includes graphs illustrating the hardness and modulus of polyurethane films formed in Example 1.

Nano-Indentation Test:

The surface mechanical properties (modulus and hardness) of the PUD films have been studied by nano-indentation test. In this test, a nano-indenter tip indents the surface to a pre-determined load, i.e. to a predetermined depth, in 15 seconds, hold at the load for 30 seconds to observe visco-creep, if any, and then unload in 15 seconds. Based on the indentation curve, the hardness and elastic modulus can be calculated. For all samples, a sufficient load was gradually applied to reach penetration depth of 2000 nm, and the corresponding modulus and hardness were calculated. Table-4 shows results of nano-indentation study and FIG. 5 shows indentation curves for each PUD sample. For all four samples, the difference in maximum load can be clearly observed when reaching the same depth of 2000 nm. FIG. 6 presents a comparison of hardness and modulus of PUDs studied.

TABLE 4

Surface Mechanical Properties of PUD films

| Identity | Polyol type | Modulus (Gpa) | Hardness (Mpa) |
|---|---|---|---|
| PUD-1 | Soy-polyol | 0.911 | 36.2 |
| PUD-2 | Std. Polyester diol | 4.44 | 238.6 |
| PUD-3 | Soy-polyol + Std. polyesterdiol | 1.048 | 34.4 |
| PUD-4 | Soy-polyol (low chain extender) | 1.526 | 62.5 |

The results indicate that for PUD-1 through PUD-3, with increasing soft segment content modulus decreases, with corresponding increase in hardness. PUD-2 with only short chain rigid polyester as soft segment has high modulus and hardness. It is interesting to note that PUD-4 shows high modulus and hardness compared to PUD-1, despite higher soft segment content.

This example demonstrates a sustainable technology for utilization of bio-based resources for development of advanced polymeric coating materials with >50% bio-based content. The example shows that it is possible synthesize polymeric polyol with controlled functionality and molecular weight from soybean oil. Such soy-polyols are suitable as primary components in formulation of aqueous polyurethane dispersions for coating applications. PUDs based on soy-polyol demonstrate some very unique and desirable properties, such as the hydrophobicity of their films, with a number of potential applications. It is possible to customize performance properties of PUDs using a combination of soy-polyol and commercially available polyesters polyols as soft segments, for a wide range of applications.

TABLE 3

Some characteristics of PUD and their films

| Identity | Polyol type | Prepolymer NCO/OH mole ratio | Soy-polyol Content (% by wt.) | Water-contact Angle (deg.) | Dispersion Mean Particle size (nm) | Water resistance Test rating* | Acid resistance Test rating* |
|---|---|---|---|---|---|---|---|
| PUD-1 | Soy-polyol | 1.50 | 32.5 | 84 | 194.4 | 5 | 4 |
| PUD-2 | Std. Polyester diol | 1.50 | 38.8 | 78 | 24.5 | 0 | 4 |
| PUD-3 | Soy-polyol + Polyester diol | 1.50 | 43.9 | 80 | 33.7 | 3 | 4 |
| PUD-4 | Soy-polyol (low chain extender) | 1.25 | 58.2 | 83 | 79.5 | 3 | 4 |

*on 0-5 scale, 5—unaffected, 4—slight color change, 3—moderate blushing & color change, 2—complete color change, 1—complete color change and blushing, 0—complete failure Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

1. Zhang, L.; Jeon, H. K.; Malsam, J.; Herrington, R.; Macosko, C. W. Polymer 2007, 48, 6656-6667.
2. (a) Liaw, D.-J.; Lin, S.-P.; Liaw, B.-Y. J. Polym. Sci., Part A: Polym. Chem. 1999, 37, 1331-1339. (b) Liaw, D.-J.; Huang, C.-C.; Liaw, B.-Y. Polymer 1998, 39, 3529-3535. (c) Liaw, D.-J. J. Appl. Polym. Sci. 1997, 66, 1251-1265. (d) Baron, A.; Rodriguez-Hernandez, J.; Papon, E. Macromol. Chem. Phys. 2005, 206, 2381-2389.
3. Wei, X.; Yu, X. J. Appl Polym Sci Part B: Polym Phys 1997, 35, 225.
4. Lee, S. Y.; Lee, J. S.; Kim, B. K. Polym. Int. 1997, 42, 67-76.
5. Chiellini, E.; Cinelli, P.; Corti, A. Developments and Future Trends for Environmentally Dregradable Plastics. In Renewable Resources and Renewable Energy: A Global Challenge; Graziani, M., Fornasiero, P., Eds.; CRC Press: Boca Raton, Fla., 2007; pp 63-112.
6. Meier, M. A. R.; Metzger, J. O.; Schubert, U.S. Chem. Soc. ReV. 2007, 36, 1788-1802.
7. Williams, C. K.; Hillmyer, M. A. Polym. ReV. 2008, 48, 1-10. (1.)
8. M. Eissen, J. O. Metzger, E. Schmidt, and U. Schneidewind, Angew. Chem. Int. Ed., 41, 414 (2002).
9. U. Biermann, W. Friedt, S. Lang, W. Luhs, G. Machmuller, J. O. Metzger, M. R. Klaas, H. J. Schafer, and M. P. Schneider, Angew. Chem. Int. Ed., 39, 2206 (2000).
10. H. Baumann, M. Buhler, H. Fochem, F. Hirsinger, H. Zoebelein, and J. Falbe, Angew, Chem. Int. Ed. Engl., 27, 41 (1988).
11. Guo, A.; Cho, Y.; Petrovic, Z. S. J. Polym. Sci., Part A: Polym. Chem. 2000, 38, 3900-3910.
12. Petrovic, Z. S.; Guo, A.; Zhang, W. J. Polym. Sci., Part A: Polym. Chem. 2000, 38, 4062-4069.
13. Lligadas, G.; Ronda, J. C.; Galia, M.; Ca'diz, V. Biomacromolecules 2007, 8, 686-692.
14. Kong, X. H.; Narine, S. S. Biomacromolecules 2007, 8, 2203-2209.
15. Suresh Subramanian, Bedri Erdem, Jeff Anderson, Jihui Guo, Mike Kaufman, and Jeff Schneider, Third International Coating wood ACSeries Conference, September 2009.
16. Petrovic, Z. S.; Guo, A.; Javni, I.; Cvetković, I.; Hong, D. P. Polym. Int. 2008, 57, 275-281.
17. Petrovic, Z. S.; Zhang, W.; Javni, I. Biomacromolecules 2005, 6, 713-719.
18. Hou, C. T. Adv. Appl. Microbiol. 1995, 41, 1-23.
19. Petrovic, Z. S., Polymer Reviews (2008), 48(1), 109-155.
20. Lu, Youngshang, and Larock, R. C., Biomacromolecules 2008, 9, 3332-3340.
21. Lligadas, G.; Ronda, J. C.; Galia, M.; U. Biermann, Metzger, J. O., Journal of Polymer Science: Part A: Polymer Chemistry, Vol. 44, 634-645 (2006).
22. Bernquist H, James, D., Ekvall, K., Wennerberg, P., and Sörensen, K., RadTech Europe—2007.
23. Nanda A K, Wicks D A, Madbouly S A, Otaigbe J U. Macromolecules 2006; 39:7037.
24. Nanda A K, Wicks D A. Polymer 2006; 47, 1805.
25. Subramani S., Lee,. J. M., Cheong. I. W., & Kim. J. H., (2005). Synthesis and Characterization of Water-Borne Crosslinked Silylated Polyurethane Dispersions. Journal of Applied Polymer Science, 98, 620-631.

What is claimed is:

1. A water-dispersible polyurethane polymer comprising:
   (a) hydrophobic soft segments comprising an oligomeric polyether segment comprising 1,2-di-substituted oxyethylene repeating units according to the following Structure I:

wherein R and R' are groups resulting from the ring-opening polymerization of epoxidized vegetable oil fatty acid esters; and
   (b) hydrophilic hard segments comprising an ionic group; wherein:
      (i) the hydrophobic soft segments and the hydrophilic hard segments in the polyurethane polymer are linked via urethane groups; and
      (ii) the polyurethane polymer has a structure capable of forming a dispersion of polyurethane polymer particles in an aqueous medium.

2. The water-dispersible polyurethane polymer of claim 1, further comprising:
   (c) chain extending hard segments, wherein the chain extending hard segments link prepolymer units comprising a segmented alternating urethane structure.

3. The water-dispersible polyurethane polymer of claim 2, wherein the chain extending hard segments link the prepolymer units via urea (carbamide) groups.

4. The water-dispersible polyurethane polymer of claim 1, wherein:
   (i) R is selected from the group consisting of alkyl groups and ester-terminated alkyl groups; and
   (ii) R' is selected from the group consisting of alkyl groups and ester-terminated alkyl groups, with R' being an alkyl group when R is an ester-terminated alkyl group and R' being an ester-terminated alkyl group when R is an alkyl group.

5. The water-dispersible polyurethane polymer of claim 1, wherein the oligomeric polyether segment comprises a urethane reaction product of a corresponding oligomeric polyether polyol according to the following Structure II:

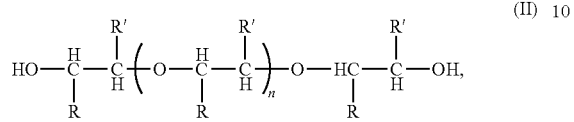

wherein n+2 represents the number of 1,2-di-substituted oxyethylene repeating units in the oligomeric polyether segment.

6. The water-dispersible polyurethane polymer of claim 5, wherein the oligomeric polyether polyol comprises a ring-opening polymerization reaction product of epoxidized vegetable oil fatty acid esters.

7. The water-dispersible polyurethane polymer of claim 6, wherein the epoxidized vegetable oil fatty acid esters comprise epoxidized soybean oil fatty acid methyl esters.

8. The water-dispersible polyurethane polymer of claim 5, wherein the urethane linking groups between the hydrophobic soft segments and the hydrophilic hard segments are derived from a reaction product of a diisocyanate compound, the oligomeric polyether polyol, and a hydrophilic hard segment precursor comprising a diol compound comprising the ionic group.

9. The water-dispersible polyurethane polymer of claim 1, wherein the ionic groups in the polyurethane polymer are selected from the group from carboxylic acid groups, neutralized carboxylate groups, and combinations thereof.

10. The water-dispersible polyurethane polymer of claim 1, wherein the polyurethane polymer has a hydrophobic soft segment content ranging from 40 wt. % to 60 wt. % relative to the polyurethane polymer.

11. The water-dispersible polyurethane polymer of claim 1, wherein the polyurethane polymer has a bio-based carbon content ranging from 25 wt. % to 70 wt. % relative to the polyurethane polymer.

12. A method for forming a water-dispersible polyurethane polymer, the method comprising:
(a) providing a hydrophobic soft segment precursor comprising an oligomeric polyether polyol comprising 1,2-di-substituted oxyethylene repeating units according to the following Structure I:

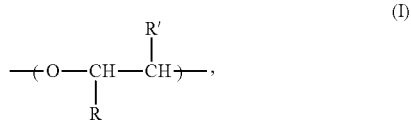

wherein R and R' are groups resulting from the ring-opening polymerization of epoxidized vegetable oil fatty acid esters;
(b) providing a first hard segment precursor comprising a diisocyanate compound;
(c) providing a hydrophilic second hard segment precursor comprising a diol compound comprising a hydrophilic group;
(d) reacting the soft segment precursor, the first hard segment precursor, and the second hard segment precursor, thereby forming a polyurethane prepolymer comprising (i) hydrophobic soft segments and hydrophilic second hard segments linked via urethane group reaction products with the first hard segment precursor and (ii) terminal isocyanate functional groups; and
(e) reacting the polyurethane prepolymer with a third hard segment precursor comprising a chain extender, thereby forming a polyurethane polymer having a structure comprising prepolymer units linked via the chain extender and being capable of forming a dispersion of polyurethane polymer particles in an aqueous medium.

13. The method of claim 12, wherein the oligomeric polyether polyol comprises a ring-opening polymerization reaction product of an epoxidized vegetable oil fatty acid ester.

14. The method of claim 12, wherein the oligomeric polyether polyol has a hydroxyl group functionality of about 2.

15. The method of claim 12, wherein in part (d) of forming the polyurethane prepolymer, the precursors are selected so that an initial ratio of isocyanate groups to hydroxyl groups ranges from 1.25 to 1.5.

16. The method of claim 12, wherein the hydrophilic second hard segment precursor comprises a carboxylic acid group as the hydrophilic group, and the method further comprises neutralizing the carboxylic acid group in the polyurethane polymer.

17. A polyurethane polymer dispersion comprising:
(a) an aqueous medium comprising water; and
(b) the polyurethane polymer of claim 1 stably dispersed in the aqueous medium in the form of polyurethane polymer particles.

18. The polyurethane polymer dispersion of claim 17, wherein the polyurethane polymer particles have a mean particle size ranging from 30 nm to 200 nm.

19. The polyurethane polymer dispersion of claim 17, wherein the polyurethane polymer has a concentration in the aqueous medium sufficient to form a film upon application of the polyurethane polymer dispersion to a substrate followed by water removal from the applied polyurethane polymer dispersion.

20. A method for coating a substrate, the method comprising:
(a) providing the polyurethane polymer dispersion of claim 17;
(b) applying the polyurethane polymer dispersion to a substrate; and
(c) removing water from the applied polyurethane polymer dispersion, thereby forming a film adhered to the substrate, the film comprising the polyurethane polymer.

21. A coated article comprising:
(a) a substrate; and
(b) the polyurethane polymer of claim 1 adhered to the substrate in the form of a film.

22. The article of claim 21, wherein the film is a thermoplastic film formed via hydrogen-bonding interactions between urethane groups of the polyurethane polymer.

* * * * *